Feb. 22, 1955 R. E. STECK 2,702,770
PRODUCTION OF FRICTION MATERIALS
Filed Aug. 14, 1951 2 Sheets-Sheet 1
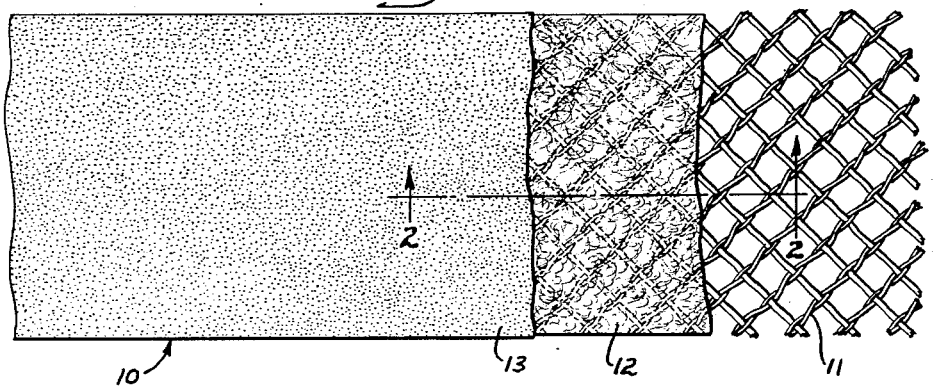
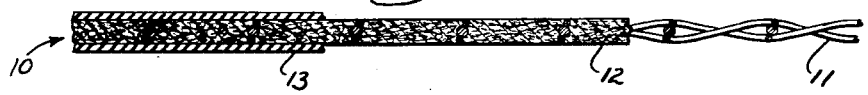
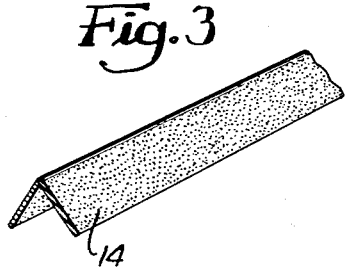
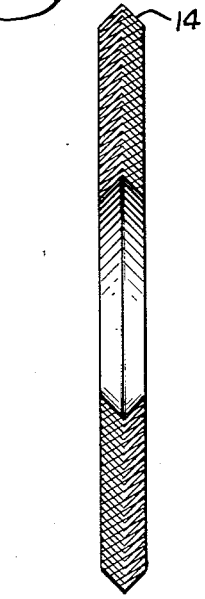
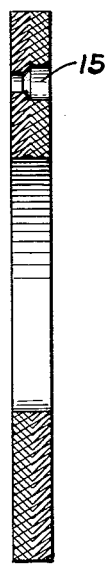
INVENTOR.
Rudolph E. Steck
BY
Gary Desmond + Parker
Attys.

Feb. 22, 1955 — R. E. STECK — 2,702,770
PRODUCTION OF FRICTION MATERIALS
Filed Aug. 14, 1951 — 2 Sheets-Sheet 2
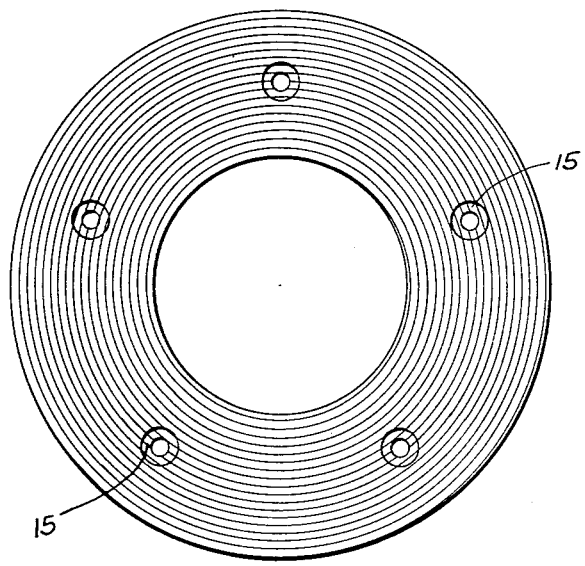
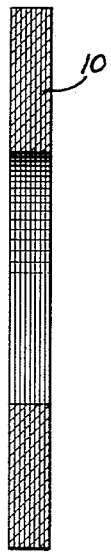
INVENTOR.
Rudolph E. Steck
BY
Gary Desmond + Parker
Attys

United States Patent Office

2,702,770
Patented Feb. 22, 1955

2,702,770

PRODUCTION OF FRICTION MATERIALS

Rudolph E. Steck, Stratford, Conn., assignor to Raybestos-Manhattan, Inc., Passaic, N. J., a corporation of New Jersey Application August 14, 1951, Serial No. 241,729

11 Claims. (Cl. 154—81)

This invention relates to improvements in the production of friction elements and particularly friction rings of the endless type suitable for use as automobile clutch facings, generally formed of strips of material wound in spiral fashion to form a coiled annulus.

More particularly, the present invention is directed to the production of clutch facings wherein a strip comprised of asbestos, heat-hardenable binder, and friction augmenting agents is shaped or folded longitudinally to impart to it an arcuate, V-shape, or other deformed symmetrical cross-section, prior to or while simultaneously coiling it spirally to form an annulus, with internesting of adjacent coils. This results in a structure, after densification and cure of the binder, which is devoid of any incipient or potential planes of cleavage which may extend directly from one face of the facing to the opposite face thereof, and thus has high resistance to tear or rupture of the facing when used in conjunction with engines which develop high rotative speeds, as described, for example, in United States Patent No. 2,096,692 to O. H. Cilley, where employment of woven asbestos fiber is indicated.

It is an object of the present invention to form friction elements of the foregoing class of novel composition and in an economical manner by elimination of the requirement of long or spinning grades of asbestos fibers, such as are required when employing woven asbestos materials, and likewise the expense of spinning, twisting, winding and weaving entailed in the production of woven asbestos materials.

This is accomplished, in accordance with the present invention, by the employment of the readily available and economical short asbestos fibers, such as those of paper making grade, deposited in a convenient and economical manner from an aqueous slurry, onto and into a woven matrix or open mesh fabric of cellulosic fibrous material. Although conventional paper formed from deposits of aqueous slurries of asbestos fibers of paper making grades do not have adequate tensile strength, elasticity or deformability to be employed in the production of friction elements of the class and manner hereinbefore specifically mentioned, my employment of a flexible supporting matrix, as will hereinafter be more particularly described, provides adequate reinforcement for the indicated purpose. Thus, I can employ short grades of asbestos fibers and obtain the benefit of their economy over spinning grades of asbestos fibers, I eliminate the expense of spinning, weaving, etc., entailed in the production of woven asbestos fabrics, and I eliminate or avoid the inherent deficiencies of papers formed of short grades of asbestos fibers whether used alone or plied up with fabrics.

Friction materials of the class herein contemplated generally contain cellulose fibers. A portion of these fibers are generally employed as aids in spinning of woven fabrics, or as felting aids and reinforcements in papers. Another portion of such fibers are also added as friction augmenting agents. Thus, although such cellulose fibers have a tendency to carbonize on the operative surfaces of the friction element under the frictional heat generated, such surface carbon formation has been found to be a desirable friction modifying agent, particularly for the purpose of minimizing the undesirable tendency of "fading" under the frictional heat of operation, as is the case when cellulose fibers are omitted.

In accordance with the present invention, I make use of these cellulose fibers not only for their friction augmenting character, but also as a reinforcement for short grades of asbestos fibers, in a novel manner. Thus, I employ an open mesh fabric of cellulose fibers, such as cotton, jute or the like fibers which may be spun and woven. These are woven in the form of an open mesh cloth in a suitable arrangement which holds the meshes apart, such as for example, by means of a leno weave. I thereafter coat this fabric and fill its meshes with a slurry of asbestos, which may include some filler and binder. The asbestos and cellulose fibers are proportioned so that the cellulose fibers comprise from about 15% to about 35% by weight of the total of these two fibrous materials. Thus, although I employ a generally conventional proportion of cellulose fibers for the purposes indicated, I use them in a novel manner.

Another advantage arising out of the employment of the woven cellulose fiber fabric is that it provides a desirable cushioning effect for the friction element in its engagement with a metallic surface in operation. Further the provision of a cellulose fabric such as cotton mesh, by reason of its absorptive character has been found desirable in the practice of adhesive bonding of friction elements to a supporting surface, thus forming better bonds.

Further advantages of the present invention and the deatils of construction and other composition thereof will be explained in connection with the following specification and accompanying diagrammatic drawings, wherein:

Fig. 1 is an enlarged plan view, with parts broken away, of a sheet of composite material in accordance with the present invention.

Fig. 2 is a further enlarged sectional view taken on the line 2—2 of Fig. 1.

Fig. 3 is a perspective view of a strip cut from the composite of Fig. 1, folded longitudinally prior to winding.

Fig. 4 is a section of a clutch facing winding, having an inverted V-shape formation, before compression and cure, and Fig. 5 is a similar view after compression and cure.

Fig. 6 is a face view of the clutch facing after compression and cure.

Fig. 7 is a section of a clutch facing showing a modified winding.

Fig. 8 is a section of clutch facing of modified construction.

Fig. 9 is a section of a brake lining constructed in a manner similar to the clutch facing of Fig. 8.

Referring to the drawings, the reference numeral 10 generally indicates a composite composed of an open mesh fabric 11 in the form of a leno weave composed of cellulose fibers, such as cotton, and having, for example, from five to fifteen openings to the linear inch. The yarns from which the mesh is woven may include wire reinforcement, although this is not essential. The fabric 11 may, if desired, be impregnated with a heat-hardenable binder, such as phenolic resin, followed by drying and partial cure, to give it body and some stiffness before further handling, and depending on the method of further handling.

The mesh fabric 11 is then coated and its meshes filled with asbestos fibers by means of an aqueous slurry of short asbestos fibers, and then dried. This slurry may include carriers, such as bentonite, china clay or linseed meal in the aqueous medium. It may also include heat-hardenable binders, such as an aqueous solution or dispersion of a phenolic resin or other binders and fillers. It may also include small amounts of sizing agents such as starch, latex, casein, glue or the like. The concentration of the asbestos slurry may be as desired depending on the fiber length, weight of deposit desired, number of applications to the mesh, or method of application. Thus, I may use aqueous slurry of about 25% concentration when applying same by means of calenders or spreaders using doctor blades, or more dilute slurries of from about 2% to about 8% concentration on paper machines. Thus, for example, by drawing a cotton mesh fabric having seven openings per linear inch through a slurry composed by weight of 20 parts asbestos fiber, 5 parts bentonite and 75 parts water, and leveling off the deposit with a doctor blade and then drying, a composite was obtained composed of 26% cotton, 59.2% asbestos and 14.8% bentonite. The proportion of fibers was 69.5% asbestos and 30.5% cotton. Application of the asbestos slurry may suitably be made on a modified paper machine employing 2 to 8% slurries. Thus, for example, the same mesh fabric was passed through the head box of a paper making machine containing an 8% slurry of asbestos and including 12% heat-hardenable powdered phenol formaldehyde resin and 4% starch based on the asbestos. This permitted coating and filling of the cotton mesh from both sides, and it was continuously passed onto a Fourdrinier type wire and dried. This formed a composite composed by weight of 20% cotton, 69% asbestos, 2.7% starch and 8.3% resin, the proportions of fibers being 22.5% cotton and 77.5% asbestos. The meshes were entirely filled, as at 12, with the asbestos composition, with the latter firmly anchored within and onto the mesh fabric. This is to be distinguished from a structure which might result from plying up a layer of cloth and asbestos paper on both sides, since the latter leaves unfilled voids within the structure which tend to cause delamination and blistering when saturated with a binder and thereafter exposed to forced drying conditions.

The asbestos filled cotton mesh fabric, after drying is coated with a binder-friction material filler composition cement, such as a rubber or rubber containing cement, the composition of which will depend to some extent on the amount and nature of the fillers and binders, if any, which were included in the asbestos slurry or on the original mesh fabric. Such composition in general comprises inorganic fillers such as litharge and barytes, and heat-hardenable binders, such as drying oils, thermosetting synthetic resins, rubbers, and the like, generally, although not necessarily, as a mixture of two or more of such binders. The resins are generally of the phenolic type, such as the phenol aldehydes, particularly phenol formaldehyde, which may be of an oil modified type. The rubber may be either natural rubber or a synthetic rubber such as polychloroprene, butadiene-styrene copolymer, butadiene-acrylonitrile copolymer, or the like, and such rubbers may be in modifying combination with the resins or in admixture. These solids are formed into a cement with from about 2 to 4 parts of hydrocarbon solvent for the soluble components, to 4 parts of total original solids. The composition further includes vulcanizing agents for the rubbers. A typical example of such binder composition, for the purpose of illustration and not limitation is as follows, the proportions given being in parts by weight:

| | |
|---|---|
| Rubber | 7.40 |
| Accelerator | .22 |
| Sulphur | 7.92 |
| Barytes | 31.80 |
| Litharge | 24.90 |
| Graphite | 1.62 |
| Rosin | 1.08 |
| Phenolic resin | 25.06 |
| | 100.00 |

The foregoing composition is suitably applied to a fabric filled with an asbestos slurry containing only a sizing agent, such as a small amount of starch, but without resin binder. If an appreciable amount of resin binder is included in the slurry a proportionate amount may be eliminated from the foregoing resin-rubber cement composition.

Another example of coating composition which is essentially a rubber cement is the following, the proportions being in parts by weight:

| | |
|---|---|
| Rubber | 100 |
| Sulphur | 30 |
| Graphite | 70 |
| Accelerator | 3 |
| Barytes | 10 |
| Litharge | 11 |
| Rosin | 2 |

The foregoing was made to a cement with 160 parts of naphtha solvent. It may suitably be employed in the presence or absence of any fillers or binders which may have been pre-incorporated in the aqueous asbestos slurry.

Depending on the fluidity or viscosity of the cement composition, it may be either frictioned onto the asbestos-cotton composite, or the composite may be passed through the cement solution to coat and impregnate both faces thereof as at 13, and excess removed by suitable means, such as squeeze rolls, and then dried to remove solvent, but without cure of the binder. In general the total amount of solids, that is binder and friction material fillers, is approximately equal to the weight of the fibrous materials, or from about 40 to about 60 per cent by weight of the composite.

The impregnated and coated composite 10 is then cut into strips of for example ½ to ⅜ inch in width, and preferably in a manner whereby the strands of the mesh fabric 11 extend diagonally. It is then longitudinally shaped or deformed to for example the strip 14 of Fig. 3 having a V-shaped cross-section. This shaped strip is thereafter helically wound with adjacent coils in internesting relationship to form the annulus of Fig. 4, by suitable means in the manner indicated in the aforesaid patent. As a result of its composition, and particularly due to its woven matrix of open mesh cellulosic fibrous material, the composite 10 has many of the strength characteristics of a woven fabric, but may be produced in a more controlled and thinner character than is possible with conventional woven asbestos fabrics. Further, it is of an elastic nature and has good tensile strength adequate for required stretching without rupture in the shaping and winding operations.

The coiled annulus is thereafter subjected to heat and pressure by suitable means, such as, for example, in a mold to densify it, and to cause the binder to flow and to permeate and consolidate the windings, and to heat-harden or cure the binder content, after which the unit is subjected to a finishing operation such as by grinding to form the product shown in Figs. 5 and 6. The rivet holes 15 may be formed during the molding operation or formed subsequently. The cotton mesh matrix employed retains its reinforcing character in the finished product, and thus also gives strength around the rivet holes, as distinguished from employment of molded fibrous mixes or materials devoid of woven fabrics.

It will be understood that although I have in the foregoing described the preferred embodiment of my invention and to which the composite material 10 is particularly adapted and advantageous, as a non-fully equivalent I may employ flat wound coils of the same material 10 to produce a clutch facing as shown in Fig. 7, since even in such case the economy of the composite over woven asbestos fabrics, and advantage over entirely non-woven materials, for the reasons previously given is inherent.

As further non-fully equivalent alternatives, I may employ the composite material 10 for the production of clutch facings and brake linings by laminating a plurality of plies thereof and then blanking to form clutch facings as in Fig. 8 or cutting into strips or segments for brake linings as in Fig. 9, followed by heat and pressure in a mold or press to cause the binder to flow and permeate and consolidate the laminations and to densify them, and to heat-harden or cure the binder content, as previously described. Friction elements formed in this manner also have the advantages of economy over women asbestos fabrics and better strength than similar elements formed of entirely non-woven compositions, for the reasons likewise previously indicated.

I claim as my invention:

1. A composite friction material fabric comprised of an open-mesh woven cellulose fiber cloth and short asbestos fibers disposed within the meshes of said cloth, said composite further including a cement coating containing heat hardened binder and friction material fillers.

2. A composite friction material fabric comprised of an open-mesh woven cellulose fiber cloth and short asbestos fibers disposed within the meshes of said cloth, the cellulose fibers comprising from about 15% to about 35% by weight of the total weight of the cellulose and asbestos fibers, said composite including an added cement coating containing heat hardened binder and friction material fillers.

3. A composite friction material fabric comprised of an open-mesh woven cellulose fiber cloth coated and its meshes filled with short asbestos fibers including fillers, the cellulose fibers comprising from about 15% to about 35% by weight of the total weight of the cellulose and asbestos fibers, the opposed surfaces of said asbestos filled and coated cellulose cloth carrying a cement containing heat-hardened binder and friction material fillers.

4. A composite friction material fabric comprised of an open-mesh woven cellulose fiber cloth coated and its meshes filled with short asbestos fibers including heat-hardened binder, the cellulose fibers comprising from about 15% to about 35% by weight of the total weight of the cellulose and asbestos fibers, the opposed surfaces of said asbestos filled and coated cellulose cloth carrying a cement containing heat-hardened binder and friction material filler.

5. The method of forming a composite friction material fabric, which comprises coating an open-mesh woven cellulose fiber cloth and filling its meshes with an aqueous slurry containing short asbestos fibers in an amount to provide a fibrous fabric containing from about 15% to about 35% of cellulose fibers of the total weight of the cellulose and asbestos fibers, drying said composite, coating the opposed surfaces thereof with a cement containing heat-hardenable binder and friction material fillers and then drying to remove solvent content from said cement.

6. A friction element comprising a plurality of compressed and consolidated layers of composite fabric each composed of open-mesh woven cellulose fiber cloth coated and its meshes filled with short asbestos fibers and further coated with a cement containing heat-hardened binder and friction material fillers, the cellulose fiber comprising from about 15% to about 35% of the total weight of cellulose and asbestos fibers.

7. The method of forming a friction element, which comprises coating an open-mesh woven cellulose fiber cloth and filling its meshes with an aqueous slurry containing short asbestos fibers in an amount to provide a fibrous composite containing from about 15% to about 35% of cellulose fibers of the total weight of the cellulose and asbestos fibers, drying said composite, coating the opposed surfaces thereof with a cement containing heat-hardenable binder and friction material fillers, drying to remove solvent content from said cement, and then subjecting a plurality of layers of the resulting composite fabric to heat and pressure to densify them and cause the binder to flow and permeate and consolidate the layers and to harden the binder.

8. An endless clutch facing composed of a spirally wound strip of thin, flexible, composite fabric comprised of an open-mesh woven cellulose fiber cloth coated and its meshes filled with short asbestos fibers, the cellulose fibers comprising from about 15% to about 35% of the total weight of cellulose and asbestos fibers, said asbestos filled and coated cellulose cloth including a cement coating containing heat-hardened binder and friction material fillers.

9. An endless clutch facing composed of a spirally wound strip of thin, flexible, composite fabric comprised of an open-mesh woven cellulose fiber cloth coated and its meshes filled with short asbestos fibers, the cellulose fibers comprising from about 15% to about 35% of the total weight of the cellulose and asbestos fibers, said asbestos filled and coated cellulose cloth including a cement outer coating containing heat-hardened binder and friction material fillers, said strip being deformed longitudinally to provide a symmetrical cross-sectional form with adjacent coils thereof secured together in internesting relationship.

10. A friction element suitable for use as a clutch facing, comprising an annular body formed of a thin, flexible strip comprised of an open-mesh woven cellulose fiber cloth coated and its meshes filled with short asbestos fibers including heat-hardenable binder, the cellulose fibers comprising from about 15% to about 35% of the total weight of the cellulose and asbestos fibers, the opposed surfaces of said composite carrying a cement containing heat-hardenable binder and friction material fillers, said strip being longitudinally deformed to a symmetrical cross-sectional form and helically wound with adjacent coils in internesting relationship and compressed to consolidate the coils upon each other and heat treated to harden the binder.

11. The method of forming a friction element suitable for use as a clutch facing, which comprises coating an open-mesh woven cellulose fiber cloth and filling its meshes with an aqueous slurry composed of short asbestos fibers, in an amount to provide a fibrous composite containing from about 15% to about 35% of cellulose fibers by weight of the total of cellulose and asbestos fibers, drying said composite, coating the opposed surfaces thereof with a cement containing heat-hardenable binder and friction material fillers, drying to remove solvent content from said cement, longitudinally folding a relatively narrow strip of said composite fabric to provide a symmetrical cross-sectional form, winding said strip to form an annular body in the form of coils in internesting relationship, and subjecting the resulting body to heat and pressure to consolidate the coils upon each other and to heat harden the binder.

References Cited in the file of this patent

UNITED STATES PATENTS

| | | |
|---|---|---|
| 2,052,808 | Spokes | Sept. 1, 1936 |
| 2,061,919 | Nanfeldt | Nov. 24, 1936 |
| 2,096,692 | Cilley | Oct. 19, 1937 |
| 2,504,144 | Morris | Apr 18, 1950 |
| 2,546,056 | Batchelor | Mar. 20, 1951 |
| 2,554,128 | Spokes | May 22, 1951 |

FOREIGN PATENTS

| | | |
|---|---|---|
| 480,599 | Great Britain | Feb. 24, 1938 |